United States Patent
Fodor et al.

(10) Patent No.: US 10,320,511 B2
(45) Date of Patent: Jun. 11, 2019

(54) METHODS AND ARRANGEMENTS FOR PILOT SEQUENCE COORDINATION

(71) Applicant: Telefonaktiebolaget LM Ericsson (publ), Stockholm (SE)

(72) Inventors: Gabor Fodor, Hässelby (SE); Johnny Karout, Göteborg (SE); L. Srikar Muppirisetty, Göteborg (SE); Henk Wymeersch, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

(21) Appl. No.: 15/557,220

(22) PCT Filed: Oct. 16, 2015

(86) PCT No.: PCT/SE2015/051100
§ 371 (c)(1),
(2) Date: Sep. 11, 2017

(87) PCT Pub. No.: WO2016/159851
PCT Pub. Date: Oct. 6, 2016

(65) Prior Publication Data
US 2018/0175960 A1 Jun. 21, 2018

Related U.S. Application Data

(60) Provisional application No. 62/140,481, filed on Mar. 31, 2015.

(51) Int. Cl.
*H04B 7/06* (2006.01)
*H04J 11/00* (2006.01)
*H04B 7/024* (2017.01)
*H04B 7/0452* (2017.01)
*H04W 72/04* (2009.01)
*H04L 5/00* (2006.01)
*H04L 25/02* (2006.01)

(52) U.S. Cl.
CPC .......... *H04J 11/0033* (2013.01); *H04B 7/024* (2013.01); *H04B 7/0452* (2013.01);
(Continued)

(58) Field of Classification Search
USPC ................................................ 370/252, 329
See application file for complete search history.

(56) References Cited

U.S. PATENT DOCUMENTS

| 9,408,095 B2 | 8/2016 | Lightstone et al. |
| 2006/0030366 A1* | 2/2006 | Park ..................... H04B 7/0408 455/562.1 |

(Continued)

FOREIGN PATENT DOCUMENTS

WO 2015150874 A1 10/2015

OTHER PUBLICATIONS

3rd Generation Partnership Project, "Technical Specification Group Radio Access Network; Study on Elevation Beamforming/Full-Dimension (FD) MIMO for LTE (Release 13)", 3GPP TR 36.897 V0.2.1, Feb. 2015, pp. 1-25.
(Continued)

*Primary Examiner* — Eva Y Puente
(74) *Attorney, Agent, or Firm* — Coats & Bennett, PLLC

(57) ABSTRACT

The present disclosure relates to coordinating the pilot sequences that are used by several wireless devices being served by one or more network nodes. In particular it relates to coordinating pilot signals used by adjacent cells or by cells within a limited area. The disclosure also relates to a pilot coordination unit, to a network node, to a wireless device and to corresponding methods and computer programs. The disclosure proposes a method performed in a pilot coordination unit (120) in a communication system, for coordinating pilot sequences used by several wireless devices (10a, 10b) served by one or more network nodes (110a, 110b). The method comprises obtaining (S12), estimated angles of arrival, of the wireless devices (10a, 10b), in the corresponding serving network nodes (110a, 110b). The method further comprises allocating (S14) pilot sequences, to be used by the wireless devices (10a, 10b)
(Continued)

based on the obtained estimated angles of arrival. The method also comprises providing (S15) information to the wireless devices about the respective allocated pilot sequence.

20 Claims, 13 Drawing Sheets

(52) U.S. Cl.
CPC ......... *H04B 7/0617* (2013.01); *H04L 5/0035* (2013.01); *H04L 5/0048* (2013.01); *H04L 25/0204* (2013.01); *H04W 72/0453* (2013.01); *H04L 25/0248* (2013.01)

(56) References Cited

U.S. PATENT DOCUMENTS

| | | | | |
|---|---|---|---|---|
| 2011/0026482 A1* | 2/2011 | Li | ....................... | H04L 5/0048 370/329 |
| 2011/0254736 A1 | 10/2011 | Thomas et al. | | |
| 2012/0306697 A1* | 12/2012 | Kimura | .................. | H01Q 3/267 342/368 |
| 2014/0376464 A1* | 12/2014 | Nam | .................... | H04B 7/0639 370/329 |
| 2016/0127094 A1* | 5/2016 | Jiang | ..................... | H04L 5/0048 370/252 |
| 2017/0187504 A1* | 6/2017 | Qian | ..................... | H04L 5/0048 |

OTHER PUBLICATIONS

Ferreol, A. et al., "A Low-Cost AOA-TDOA Approach for Blind Geolocation in Multi-Paths Context", 18th European Signal Processing Conference, Aug. 23-27, 2010, pp. 686-690, Aalborg, Denmark.

Yin, H., et al., "A Coordinated Approach to Channel Estimation in Large-scale Multiple-antenna Systems", IEEE Journal on Selected Areas in Communications, Feb. 2013, pp. 1-10, vol. 31, Issue 2.

Liu, C. et al., "Joint TDOA and AOA location algorithm", Journal of Systems Engineering and Electronics, Apr. 2013, pp. 183-188, vol. 24, No. 2.

* cited by examiner

METHODS AND ARRANGEMENTS FOR PILOT SEQUENCE COORDINATION

TECHNICAL FIELD

The present disclosure relates to coordination of pilot sequences that are used by several wireless devices being served by one or more network nodes. In particular it relates to coordinating pilot signals used by adjacent cells or by cells within a limited area. The disclosure also relates to a pilot coordination unit, to a network node, to a wireless device and to corresponding methods and computer programs.

BACKGROUND

The 3rd Generation Partnership Project, 3GPP, is responsible for the standardization of the Universal Mobile Telecommunication System, UMTS, and Long Term Evolution, LTE. LTE is also sometimes referred to as Evolved Universal Terrestrial Access Network, E-UTRAN. LTE is a technology for realizing high-speed packet-based communication that can reach high data rates both in the downlink and in the uplink, and is a next generation mobile communication system relative to UMTS. LTE brings significant improvements in capacity and performance over previous radio access technologies.

The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE. The area served by one or sometimes several RBSs is referred to as a cell.

The ever increasing end-user demands are a significant challenge to the operators. Separating users spatially by means of precoding and/or beamforming is one way to improve the performance of a wireless system.

Although only Multiple Input Multiple Output, MIMO, systems up to 8 or 16 antennas are supported by existing standards and so called MIMO transmission modes, the use of very large antenna arrays (also called massive or "Full Dimension" MIMO systems) in commercial cellular systems has been proposed only recently. The 3rd Generation Partnership Project, 3GPP, is currently working on the implications of supporting up to 64 transceiver units, TXRU, to serve many users simultaneously (so called multiuser MIMO) and/or create narrow (pencil) beams to scheduled users. See 3GPP TR: 36.897: Study on Elevation Beamforming/Full-Dimension, FD, MIMO for LTE: version 0.2.1.

The expectation of massive MIMO systems is a boost of the spectral efficiency, capacity as well as providing a uniform user experience as opposed to large variations in the received user bit rate or quality of service between cell center and cell edge areas. The underlying theory of massive MIMO systems is that under the assumption of perfect channel estimation, the vector channel of a served user grows orthogonal to other users and thereby interference can be virtually eliminated.

Downlink transmission methods rely on knowledge of the channel at the transmitting base station, BS, or, more precisely, the availability of estimates of the channels between the BS antennas and the wireless devices to which this BS is transmitting information. This channel state information is then used to "precode" the information intended for each of the wireless devices prior to transmission, in such a way, that each of the wireless devices is able to decode the signals of its own interest.

The necessary channel state information is obtained by transmitting pilots, i.e., known signature waveforms, over the wireless medium and estimating these channels based on the received waveforms. Then these estimates are used for generating the MIMO precoder (i.e., the transmission method) and for transmitting data to the wireless devices.

However, pilot sequences represent a limited resource, because the length, number of symbols, of pilot sequences is limited by the coherence interval and bandwidth of the wireless channel. In turn, the number of orthogonal pilot sequences and thereby the number of separable users is limited by the length of the available pilot sequences. Consequently, when the number of antennas grows large, the number of spatially separable users is not limited by the number of antennas but the number of available orthogonal pilot sequences. Therefore, in multicell systems, the pilot sequences must be reused which unavoidably leads to interference between identical pilot sequences. This interference in multicell massive MIMO systems is known as the pilot contamination problem.

FIG. 1 illustrates that if a pilot is reused in adjacent cells; there may be interference, because the pilots transmitted in different cells may be overlapping. Hence, the base station 110a cannot differentiate the pilots transmitted by the two UEs 10a and 10b.

In massive MIMO systems, the so called pilot contamination, PC, or multicell pilot signal interference problem is known to degrade the quality of channel state information, CSI, at the BS, which in turn degrades the performance in terms of actually achieved spectral efficiency, beam forming gains and cell edge user throughput.

A well-known prior art technique is to avoid pilot sequence reuse-1 in neighbor cells and thereby maintain user separation in the code domain. Pilot sequence reuse-1 (or full reuse) implies that all pilot sequences are reused in every cell, which should be compared to pilot sequence reuse-2, where the effective pilot cell-reuse equals 2, i.e. each pilot is reused in every 2 cells or pilot sequence reuse-3, where the effective pilot cell-reuse equals 3, i.e. each pilot is reused in every 3 cells. The basic idea is similar to higher frequency reuse schemes known in GSM systems.

Another prior art technique proposes a solution to the pilot contamination problem based on multicell cooperation to achieve spatial separation between users who use the same pilot sequence. According to the prior art, the cooperating cells exchange long term CSI and perform a coordinated pilot assignment to users. A long term CSI is essentially the average of the user channels over some time window. The long term CSI is exchanged in the form of the so called covariance matrices of user vector channels. The coordinated pilot assignment to users is performed such that spatially well separated users are assigned identical pilot sequences in neighboring cells. By spatial separation, the impact of intercell interference and thereby pilot contamination is mitigated.

The problem with the state of the art multicell coordination based scheme is three-fold:

Cooperating network nodes such as cellular base stations or wireless access points need to measure, estimate and subsequently exchange channel covariance matrices. The exchange of such covariance matrices is problematic, because the size of such matrices grows quadratically with the number of antennas, whereas the actual number of the matrices grows linearly with the number of users and the number of interfering base stations;

The estimation or measurement of the covariance matrices is problematic due to the issue of long term changes in the user channels, due to changes in the long term geometry of the system due to mobility, environmental changes in the propagation conditions, etc.

The processing of the covariance matrices to determine the spatially well separated user sets imposes a computational burden on the network nodes participating in the cooperation due to the frequent updates and to the computational burden of determining pilot assignment based to the received covariance matrix information.

For further reading see "A Coordinated Approach to Channel Estimation in Large-scale Multiple-antenna Systems" H Yin, D Gesbert, M Filippou, Y Liu IEEE Journal on Selected Areas in Communications 31 (2), 264-273.

Hence, although in theory multicell cooperation can help mitigate PC effects, its fundamental input, e.g., user channel covariance matrix acquisition, exchange and processing, renders it problematic in practical systems for example due to the above problems.

Hence, there is a need for improved methods for mitigating pilot contamination.

SUMMARY

An object of the present disclosure is to provide methods and devices which seek to mitigate, alleviate, or eliminate one or more of the above-identified deficiencies in the art and disadvantages singly or in any combination and to mitigate inter-cluster interference in a communication system.

This disclosure proposes use of location information to determine the set of spatially separable users within an area and thereby the set of users in neighbor cells, which can use identical pilot sequences. This idea is based on the observation that long term channel characteristics and thereby user separation, i.e. the establishment of the set of spatially separable users, can be related to user location and more specifically on angles of arrival. Therefore pilot sequence assignment can be arranged such that users that are spatially separated reuse identical pilot sequences and cooperating base stations can reduce or eliminate the intercell interference on pilot signals, known as the pilot contamination problem.

One aspect of this disclosure provides a method, performed in a pilot coordination unit in a communication system, for coordinating pilot sequences used by several wireless devices served by one or more network nodes. The method comprises obtaining, estimated angles of arrival, of the wireless devices, in the corresponding serving network nodes. The method further comprises allocating pilot sequences, to be used by the wireless devices based on the obtained estimated angles of arrival, and providing information to the wireless devices about the respective allocated pilot sequence.

One advantage of some of the proposed methods in view of prior art cooperation based pilot coordination is e.g. that there is no need for the network node to estimate or measure the covariance matrix of user channels and exchange such matrices with cooperating network nodes.

Ultimately, one advantage of the proposed methods is to mitigate pilot contamination in MU MIMO systems without the need of introducing higher than 1 pilot sequence reuse schemes. By enabling a full pilot reuse scheme in the multiple cells of a multicell MU MIMO systems, fewer symbols need to be used for pilot sequence construction and thereby more symbols can be used for user data transmission.

In one embodiment, covariance matrices can be computed based on location information that are in turn used for pilot sequence assignment. In another embodiment, the need for channel covariance matrices is completely eliminated by establishing the spatially separable user set based on location information rather than on processing channel covariance matrices.

Another aspect provides a pilot coordination unit configured for coordinating pilot sequences used by several wireless devices served by one or more network nodes. The pilot coordination unit comprises processing circuitry configured to cause the pilot coordination unit to obtain, estimated angles of arrival, of the wireless devices, in the corresponding serving network nodes. The processing circuitry is also configured to cause the pilot coordination unit to allocate pilot sequences, to be used by the wireless devices based on the obtained estimated angles of arrival. The processing circuitry is further configured to cause the pilot coordination unit to provide information to the wireless devices about the respective allocated pilot sequence. The pilot coordination unit has all the advantages described above in relation to the disclosed method for coordinating pilot sequences used by several wireless devices served by one or more network nodes.

Another aspect provides computer program comprising computer program code which, when executed, causes a pilot coordination unit to execute the above disclosed method with all the advantages described above in relation to the disclosed method for coordinating pilot sequences used by several wireless devices served by one or more network nodes.

Another aspect provides a method performed in a network node in a communication system, for enabling coordination of pilot sequences. The method comprises receiving, from the wireless devices served by the network node, a signal comprising information defining the quality of a channel between the network node and the wireless device and positioning information defining the position of the wireless device. The method also comprises providing, to a pilot coordination unit, information defining estimated angles of arrival in the network node of wireless devices served by the network node.

Another aspect provides a network node configured for enabling coordination of pilot sequences. The network node comprises a communication interface configured for communication with wireless devices. The network node also comprises processing circuitry configured to cause the network node to receive, from wireless devices served by the network node a signal comprising information defining the quality of a channel between the network node and the wireless device and positioning information defining the position of the wireless device. The processing circuitry is also configured to cause the network node to provide, to a pilot coordination unit, information defining estimated angles of arrival in the network node, of wireless devices served by the network node. The network node has all the advantages described above in relation to the disclosed method for enabling coordination of pilot sequences.

Another aspect provides a computer program comprising computer program code which, when executed, causes a network node to execute the above disclosed method for enabling coordination of pilot sequences, with all the advantages described above in relation to the disclosed method for enabling coordination of pilot sequences.

Another aspect provides a method performed in a wireless device in a communication system, for enabling coordination of pilot sequences. The method comprises receiving information defining one or more pilot sequences allocated to the wireless device and transmitting at least one pilot sequence based on the received information.

Another aspect provides a wireless device configured for enabling coordination of pilot sequences. The wireless device comprises a radio communication interface configured for communication with a network node. The wireless device also comprises processing circuitry configured to cause the wireless device to receive, from a network node, information defining one or more pilot sequences allocated to the wireless device and transmit at least one pilot sequence based on the received information. The wireless device has all the advantages described above in relation to the disclosed method for enabling coordination of pilot sequences.

Another aspect provides a computer program comprising computer program code which, when executed, causes a wireless device to execute the above disclosed method, performed in a wireless device, for enabling coordination of pilot sequences with all the advantages described above in relation to the disclosed method for enabling coordination of pilot sequences.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 2b: illustrates an example of pilot transmission in the MU-MIMO system of FIG. 2a.

DETAILED DESCRIPTION

Figure 1:
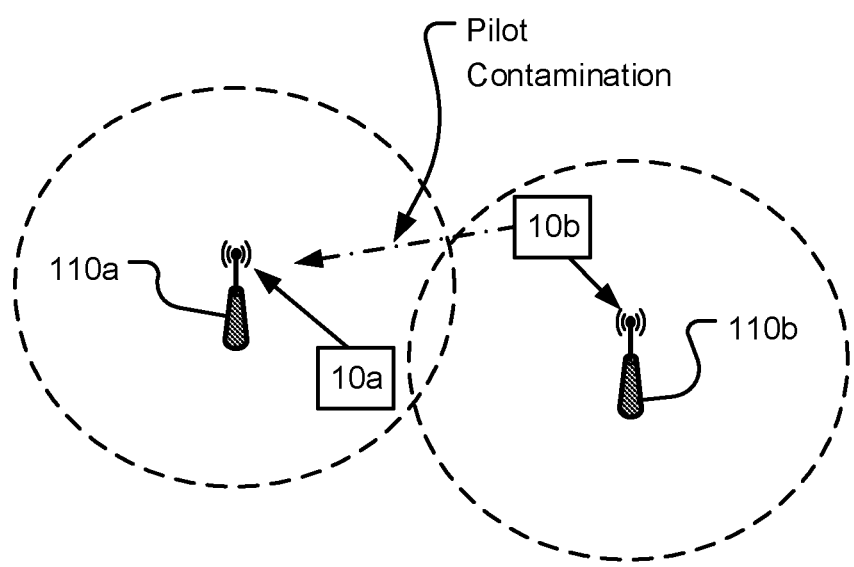
FIG. 1: illustrates an example of Pilot Contamination

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

This disclosure proposes using location information rather than covariance matrix based user channel information in determining the appropriate pilot sequence assignments to users. This is based on the observation that long term channel characteristics and thereby user separation (i.e. the establishment of the set of spatially separable users) can be related to user location, and therefore pilot sequence assignment can be arranged such that users that are spatially separated reuse identical pilot sequences.

The idea is to eliminate the scalability problem that is inherently present in the prior art technique both in terms of number of antennas and number of user and network nodes. One key step in some of the proposed methods is to relate the mean and the standard deviation of the angle of arrival, AoA, to user location rather than to channel measurements and estimation. Recall that the AoA is defined as the (estimated) angle of signal received from a wireless device in a network node with respect to a reference direction, which in 3GPP is defined as geographical North and the value of AoA is positive in the counter clockwise direction. It should be noted that the AoA of a signal does not only depend on the direction of the signal but also on the antenna configuration at the network node. Thus, the value of the AoA $\theta$ is a function of the antenna element spacing and the carrier frequency and thereby it inherently contains information that is valuable from the point of view of determining spatially separated users.

With the proposed scheme, the network node such as a cellular base station can either estimate the covariance matrix from location information. Alternatively, the user separation is based directly on location information, rather than on covariance matrix information. Thus, the required information exchange between network nodes as well as the processing burden at the network nodes in determining the pilot sequence assignment to users is mitigated.

For better understanding of the proposed methods location-based services are first briefly discussed.

Location-Based Services

Several positioning methods for determining the location of a device, which can be any of a wireless device or user equipment, UE, mobile relay, personal digital assistant, PDA, wireless device for machine type communication, also known as machine to machine communication, laptop mounting wireless devices or equipment, etc. exist. Such existing techniques can determine the position of the target device by using one or more positioning measurements, which can be performed by a suitable measuring node or the target device. Depending on the positioning method used, the measuring node can either be the target device itself, a separate radio node, i.e. a standalone node, serving and/or neighboring nodes of the target device etc. Also, depending upon the positioning method the measurements can be performed by one or more types of measuring nodes.

Specifically, the Long Term Evolution, LTE, architecture explicitly supports location services by defining the Evolved Serving Mobile Location Center, E-SMLC, that is connected to the core network, i.e. Mobility Management Entity, MME, via the so called Location Services Application Protocol, LCS-AP, interface and the Gateway Mobile Location Center, GMLC, that is connected to the MME via the standardized Lg interface.

The LTE system supports a range of methods to locate the position of the target devices, e.g. UEs, within the coverage area of the radio access network, RAN. These methods differ in accuracy and availability. Typically, satellite based methods, Assisted GNSS, are accurate with a (few) meter(s) of resolution, but may not be available in indoor environments. On the other hand, cell identity, Cell ID, based methods are much less accurate, but have high availability. Therefore, LTE uses A-GPS as the primary method for positioning, while Cell-ID (and specifically Observed Time Difference of Arrival, OTDOA) based schemes serve as fall back methods. These methods are also termed as 'infrastructure based positioning methods' since they require some level of assistance and/or measurements on radio signals related to cellular communication.

Location information of UEs can be utilized to enhance mobile network performance. For example, data rates can be boosted and network load can be decreased by allowing UEs in the vicinity to communicate with each other directly rather than sending their data through the network. This type of device-to-device, D2D, communication can be enabled and orchestrated by the network itself. Currently, 3GPP has initiated a study/work item on D2D communication and more specifically on proximity services, also known as ProSe.

The proposed technique will now be described in further detail. However, as a starting point downlink channel estimation in multi-user joint transmission will first be briefly introduced.

One of the key obstacles in multi-user joint transmission is that the transmitting side, e.g. the base station or similar network side function, need to know the per-physical-resource radio channel from transmission, TX, point to receiver, RX, antenna for each Transmission point and RX antenna in the network, typically called the downlink channel. In classical systems, only the receiver of data needs to estimate the channel to be able to demodulate the data, but here, in order to avoid interference and aim right, the transmitter needs this information as well.

In order to overcome this obstacle, it is assumed that the system uses the same radio channel frequency for both uplink and downlink transmissions and that the classical channel reciprocity is usable. The latter means that the channel estimates for one direction can be used directly or indirectly to estimate the channel in the other direction. This is a quite reasonable assumption.

The downlink channel estimates are obtained by letting the UEs periodically or aperiodically transmit pilot or sounding sequences to the transmission points which receive these sequences in order to estimate the channel. Typically, multiple orthogonal pilot sequences can be transmitted at the same time by several UEs within one cluster. In this way, the network can estimate the downlink channel for all Transmission points to multiple UEs at the same time (again, assuming reciprocity).

Once the DL channel from each Transmission point to each UE RX antenna is known (or estimated), the network needs to calculate a precoding for each physical resource (or group of physical resources) in order to transmit the D data streams from N TX antennas to the M RX antennas. The vector of data symbols to be simultaneously transmitted in a physical resource can be denoted:

$$x = \begin{bmatrix} x_0 \\ x_1 \\ \vdots \\ x_{D-1} \end{bmatrix}$$

The downlink channel matrix is denoted H. The transmitted signal vector from the N TX antennas is denoted y and the received signal vector collecting the received signals from all antennas of all users in the cluster of interest is denoted z and the noise is denoted n.

Applying a linear precoding matrix W, the received signal vector becomes:

$$z=Hy=HWx+n$$

Calculating the precoding matrix W requires knowledge of the downlink channel H, in practice in form of a channel estimate $\hat{H}$ so that $W=f(\hat{H})$ (which can be a function of additional parameters as well) where $f$ is a function chosen e.g. to maximize the average system throughput, to maximize the cell edge user throughput or to minimize the total system TX power. Examples of classical precoding functions are SLNR (maximizing Signal-to-Leakage-and-Noise ratio), Zero Forcing (minimizing interference).

Hence, the pilot contamination, PC, or multicell pilot signal interference problem degrades the quality of channel state information, CSI, at the base station, BS, which in turn degrades the performance in terms of actually achieved spectral efficiency, beam forming gains and cell edge user throughput. The proposed methods for solving this will now be described.

Figure 2A:
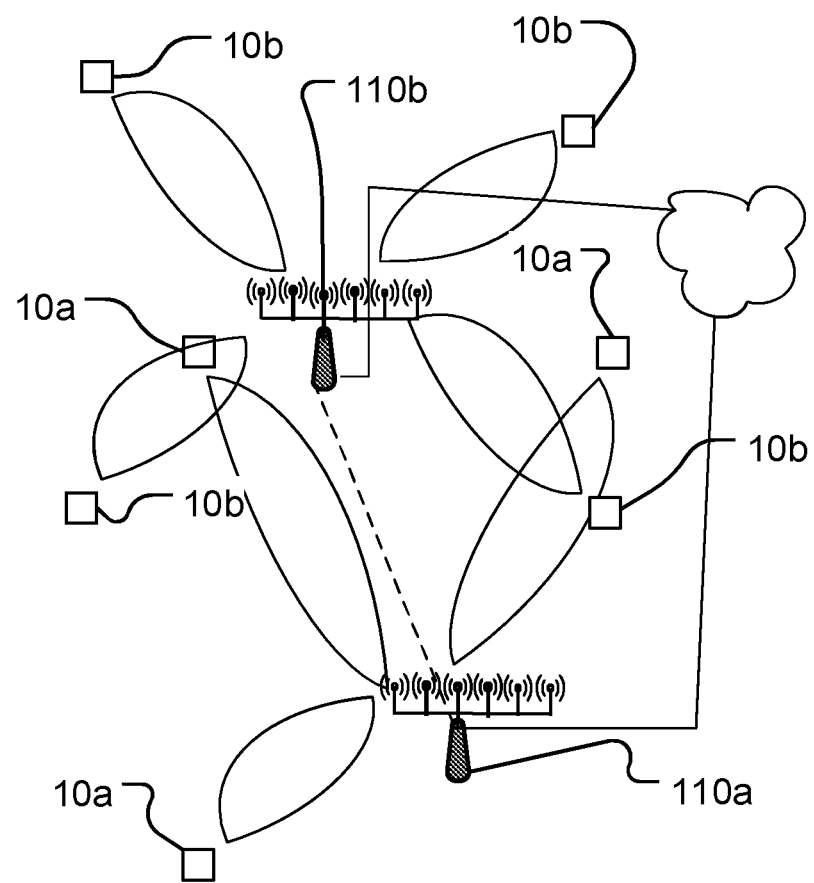
FIG. 2a: illustrates an example of MU-MIMO

FIG. 2a illustrates one example network where the proposed methods may be implemented. In FIG. 2a two base stations 110a, 110b, in LTE called eNodeBs, are transmitting to seven wireless devices 10a, 10b, in LTE UEs using pen-shaped beams. The devices 10a are served by base station 110a and the wireless devices 10b are served by base station 110b. In LTE this mode is referred to as Multi User MIMO, MU-MIMO. In MU-MIMO, a plurality of terminals transmits data signals at the same time and the same frequency. This is enabled by spatially multiplexing the data signals and thereby improving system throughput. This could also be referred to as a version of coordinated beamforming.

Figure 2B:
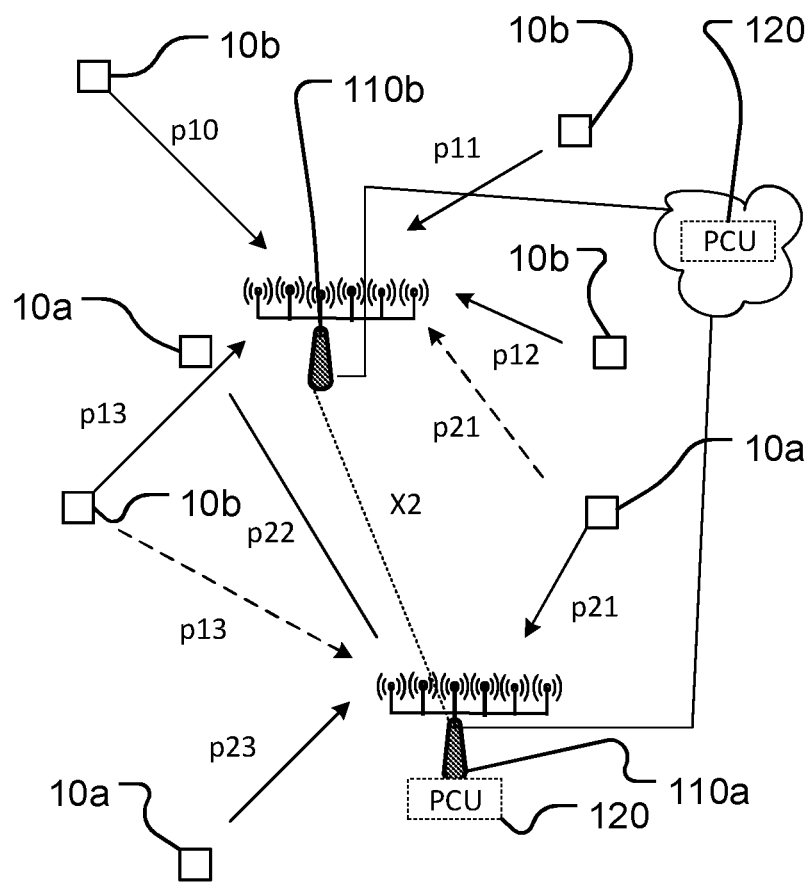

FIG. 2b illustrates an example of pilot transmission in the MU-MIMO system of FIG. 2a. The wireless devices transmit pilot signals at the same time and the same frequency from the standpoint of frequency utilization efficiency. Therefore, cyclic shift sequences, which are orthogonal sequences, for pilot signals and the cyclic shift sequences, are transmitted at the same time and the same frequency. The reception side can separate pilot signals using the nature of orthogonal sequences, and can thereby accurately estimate a channel state of each wireless device.

In the example illustrated in FIG. 2b, the two cells served by base stations 110a and 110b are partly spatially overlapping, which means that there may be pilot pollution between the wireless devices 10a, 10b served by the two base stations. This means that if the same pilots are used in the cells there may be overlap at both the receiving base stations 110a and 110b between the pilots p10, p11, p12, p13 transmitted by the wireless devices served by network node 110b and the pilots p21, p22, p23 transmitted by the wireless devices served by network node 110a.

The, proposed technique is typically used for coordinating wireless devices within a limited or restricted area as in the example of FIGS. 2a and 2b.

Note that although LTE is generally used herein as an example, the same principle may be used in other cellular systems where cell synchronization is performed in a group of cells, for example in any future generation network.

Figure 3A:
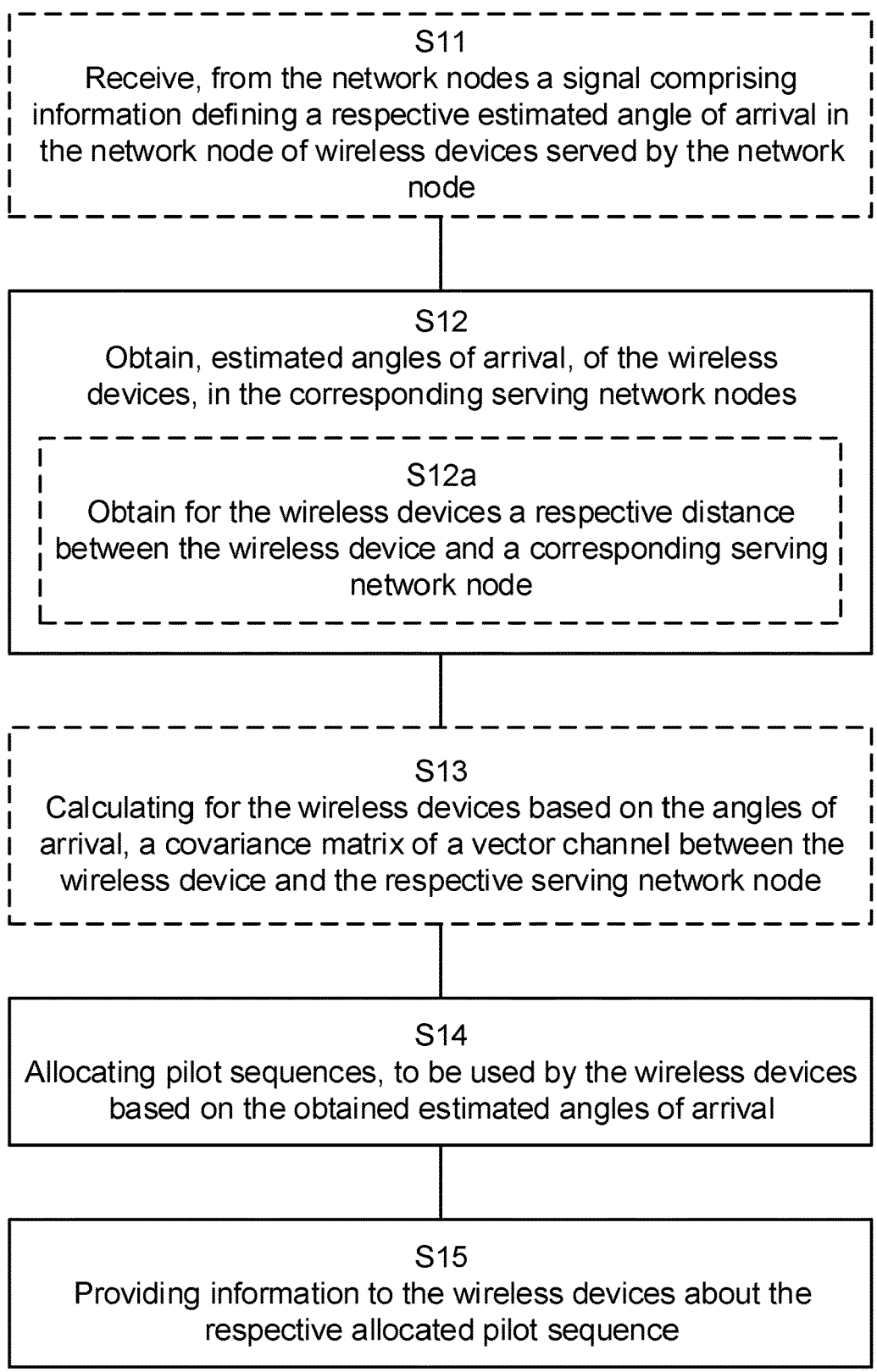
FIG. 3a: discloses a flow chart of example operations in a pilot coordination unit

A method, performed in a pilot coordination unit, PCU, in a communication system, for coordinating pilot sequences used by several wireless devices 10a, 10b served by one or more network nodes 110a, 110b will now be described referring to FIG. 3a. FIG. 3a discloses a general method of pilot coordination that may be implemented in different physical units in the communication system.

The unit performing the proposed methods is here referred to as a pilot coordination unit. The pilot coordination unit 120 may be incorporated in one or several of the network nodes 110a, 110b or may be an external unit, see FIG. 2b. Such an external unit may be implemented in the Radio Access network, in the core network or it may be a part of an operation and maintenance, O&M, system. The pilot coordination unit 120 may even be a cloud implementation.

The proposed method comprises obtaining S12, estimated angles of arrival, AoA, of the wireless devices 10a, 10b, in the corresponding serving network nodes 110a, 110b. Stated differently, the pilot coordination unit collects for the base stations 110a, 110b that it is about to coordinate, information about AoA of the wireless devices that are connected to the respective base station. The AoA is assumed to represent the AoA that a future pilot sequence will have when arriving in the base stations 110a, 110b. The AoA is typically collected for all wireless devices as far as possible. However, there may be legacy UEs being served by the network nodes that are not supporting this feature, for which the methods do not apply.

The obtaining implies that the pilot coordination unit receives, or acquires in any other way, the information about an estimated angle of arrival in the respective serving network node of pilot signals transmitted from wireless devices 10a, 10b that are to be coordinated.

The pilot coordination unit may receive the estimated AoA from the respective serving network nodes of the wireless devices. Alternatively the pilot coordination unit receives information, such as positions, from which the pilot coordination unit may itself estimate the AoAs. In practice or in an alternative/complementary design, the AoA can be estimated based on any signal, like a preceding transmission of user data.

The angle of arrival of the wireless devices is defined with respect to a reference direction, which is the same for all the wireless devices.

According to some aspects the estimated angles of arrival comprise an expected mean $\theta_{ik}^{mean}$ and a standard deviation $\theta_{ik}^{std}$ of the angle of arrival. The aspect implies relating the mean and the standard deviation of the angle of arrival, AoA, to user location rather than to channel measurements and estimation. The technique is based on the correlation between the scattering environment of the wireless devices and the angle of arrival. The momental AoA is not fixed but rather a random value that has a mean and a standard deviation. The deviation depends on the environment. The scattering area around a user may be estimated to be circular with a radius $r_s$, wherein $r_s$ may be set to a fixed value for every base station. In principle, the scattering area can be assumed to have any shape, and it can also be approximated with multiple rings.

Alternatively $r_s$ may be estimated based on measurements or signalled by higher layers. The standard deviation of the AoA may then be estimated using $r_s$, for example by $\theta_{ik}^{std}=\arctan(r_s/d_{ik})$, where $d_{ik}$ is the distance between User-i and the BS.

The method further comprises allocating S14 pilot sequences, to be used by the wireless devices 10a, 10b based on the obtained estimated angles of arrival. The basic principle is that the AoA may be used to identify wireless devices that are transmitting spatially separated pilot sequences, because such devices may reuse the same pilot. Or in other words, when allocating a pilot to a wireless device the pilot coordination unit checks for pilots transmitted by neighbor cells are spatially overlapping in order to avoid allocating these sequences. The allocation will be described in further detail below.

The method comprises providing S15 information to the wireless devices about the respective allocated pilot sequence. This may be done in different ways depending on where the pilot coordination unit is placed.

According to some aspects the allocating S14 comprises calculating an overlap of angle spread angles of arrival, AoA, and allocating the pilots such that any overlap of the angle spread angles of arrival is less than a predefined percentage. The angle spread angle of arrival is a range of angles with which a transmission is received in the network nodes. Thus, this aspect implies that a range of angles with which a transmission of the different wireless devices 10a, 10b is received in the network nodes 110a, 110b is estimated. An angle spread AoA is e.g. defined by its upper and lower limits. The angle spread angles of arrival is defined for example as $[\theta_{ik}^{mean}-\theta_{ik}^{std}, \theta_{ik}^{mean}+\theta_{ik}^{std}]$.

This implies that AoA in a base station 110a of signals transmitted by interfering wireless devices in other cells 10b, are calculated using information from the other cells and from the own cell (which will be described in detail below). Hence, when allocating a pilot sequence in network node 110a, both AoA served by the processed base station 110a and by others 110b need to be considered. If the AoA is a spread area, it is then possible to estimate the overlap between the present and possible pilots.

Hence, the pilot coordination unit will have information about the AoA of the pilot sequences transmitted by wireless devices in the different base stations.

Figure 4:
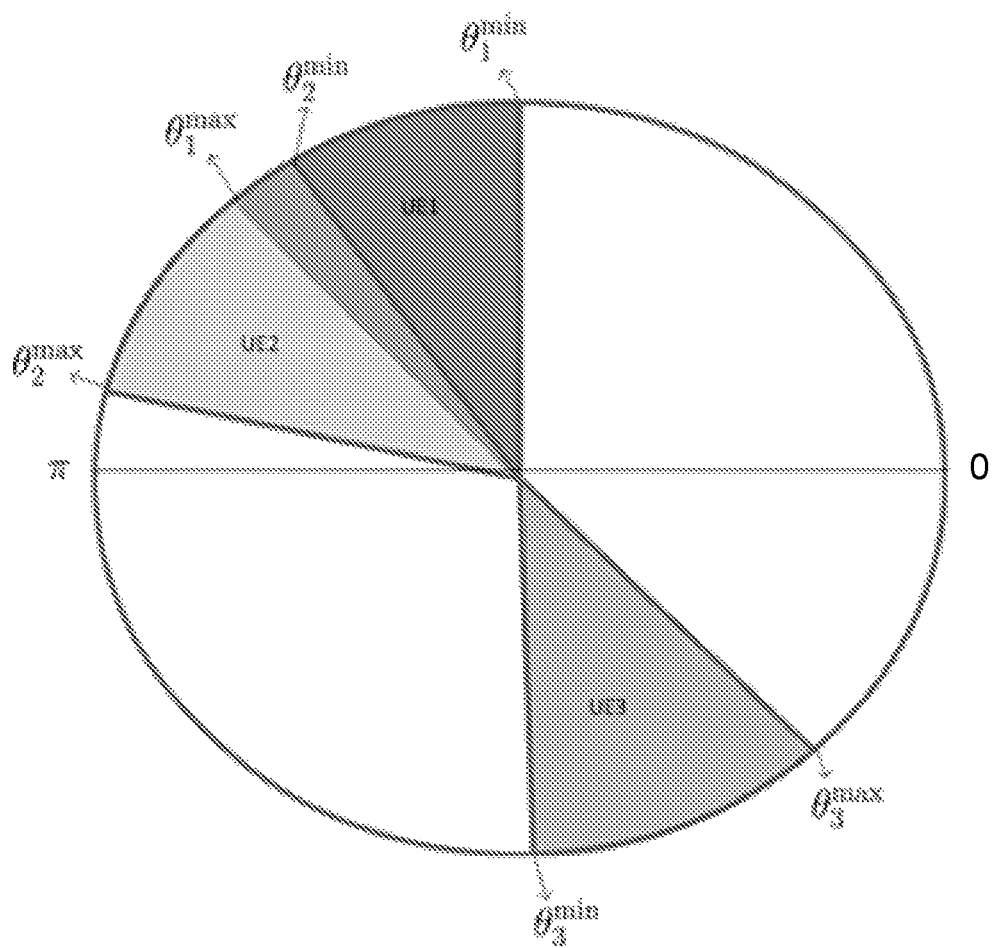
FIG. 4: discloses an example of the support of the AoA of three UE's (UE1, UE2, UE3).

In this example, illustrated in FIG. 4, in one network node, based on their locations UE1 has overlapping AoA with UE2. On the other hand UE3 has non-overlapping AoA with UE1 and UE2. If the BS needs to assign identical pilots to two users, it can assign to either to user set {UE1, UE3} or to {UE2, UE3}.

In principle it may even be possible to reuse pilots in the same cell, if they are spatially separated. The methods may thus be applied on one single network node.

According to some aspects the method comprises calculating S13 for the wireless devices based on the angles of arrival, a covariance matrix of a vector channel between the wireless device and the respective serving network node and wherein the allocating S14 is based on the calculated covariance matrices. This will be further described below. This aspect implies that the channel is estimated from the mean and the standard deviation of the angle of arrival, AoA. Thus no channel estimation is required, even though the channel covariance is used.

According to some aspects the obtaining S12 comprises obtaining S12a for the wireless devices a respective distance between the wireless device and a corresponding serving network node 110a, 110b, and wherein the allocating S14 is also based on the obtained distances.

The distance between the network nodes and the wireless devices is another aspect to consider to determining potential spatial overlap of pilots.

According to some aspects the obtaining S12 comprises receiving S11, from the network nodes 110a, 110b a signal comprising information defining a respective estimated angle of arrival in the network node of wireless devices 10a, 10b served by the network node 100.

If the pilot coordination unit and one or more of the network nodes are separated, the pilot coordination unit needs to receive information from the network nodes. Hence, if the pilot coordination unit is placed in one network node, the network node needs to receive the AoA information from the other network nodes e.g. over the in LTE so called X2 interface.

If the pilot coordination unit is a stand-alone unit it needs to receive the AoA information from all the network nodes.

According to some aspects the providing S15 comprises, sending to the serving network nodes 100 a signal comprising information defining pilot sequences allocated to wireless devices served by the network node. Stated differently, if the pilot coordination unit allocates information for other network node, the pilot coordination unit needs to send information about the allocated pilots to the network nodes. The network node needs to provide the information implicitly or explicitly to the wireless devices.

Figure 3B:
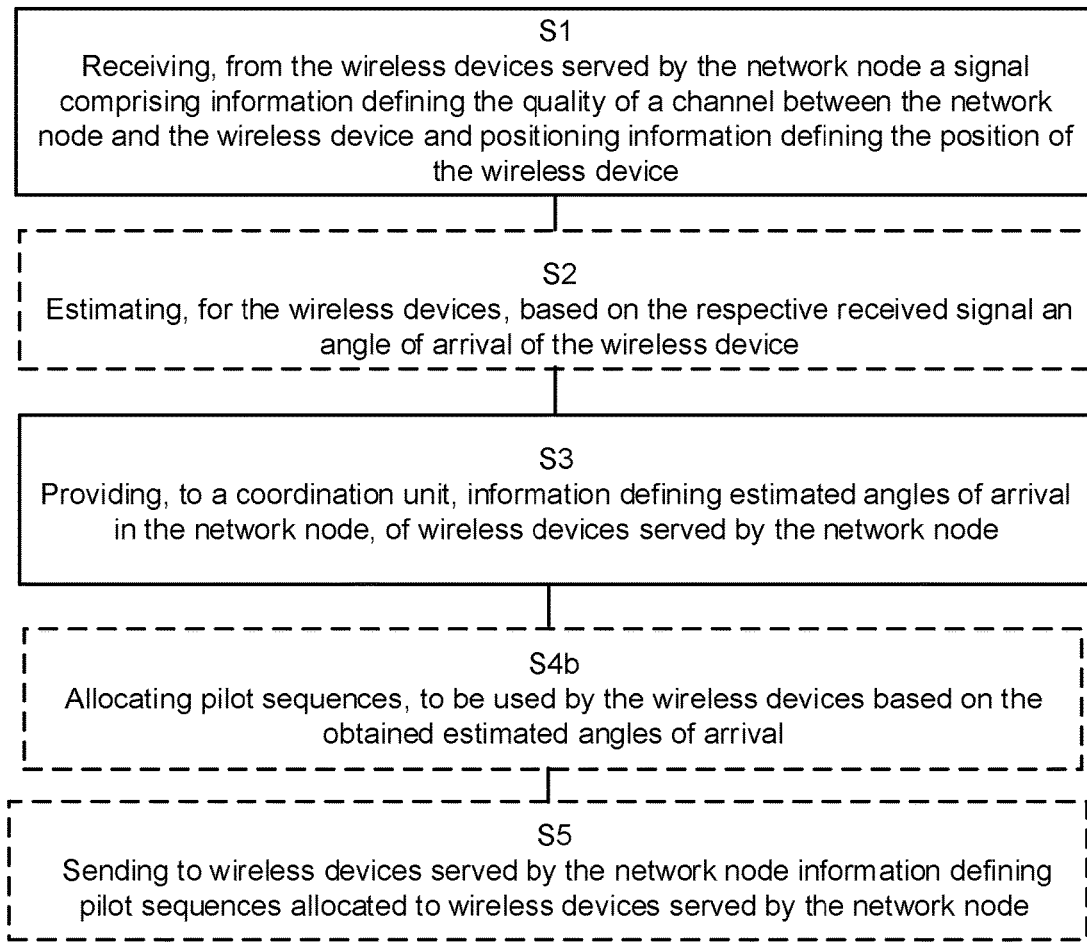
FIG. 3b: discloses a flow chart of example operations in a network node
Figure 3C:
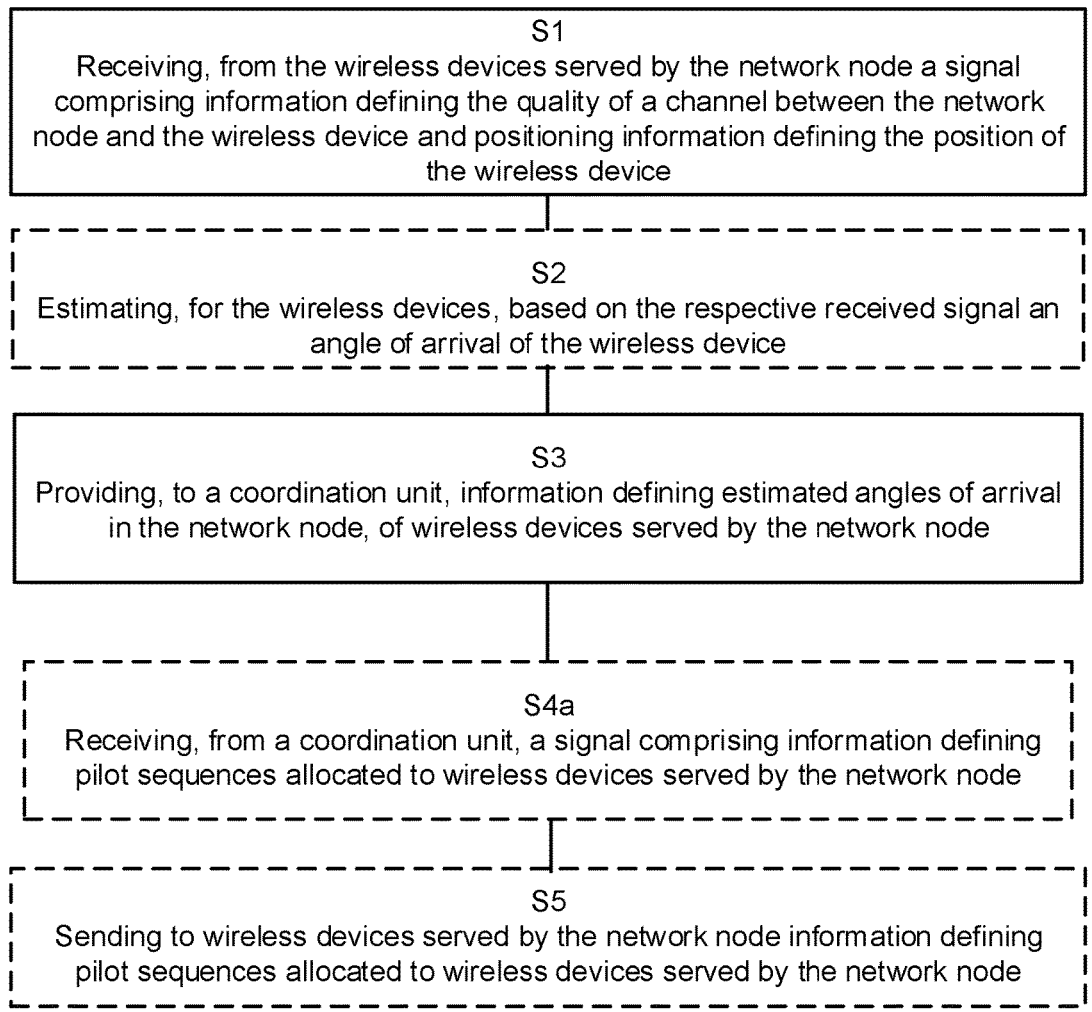
FIG. 3c: discloses a flow chart of example operations in a network node

According to some aspects the disclosure relates to a method performed in a network node 110a in a communication system, for enabling coordination of pilot sequences, as will now be described referring to FIGS. 3b and 3c.

The method comprises receiving S1, from the wireless devices 10a, 10b served by the network node 110a, 110b a signal comprising information defining the quality of a channel between the network node and the wireless device and positioning information defining the position of the wireless device 10a, 10b. Non-limiting examples of quality defining information and signals comprising quality defining information are:

Channel Quality Indicator, CQI
Received Signal Strength Indication, RSSI,
Reference Signal Received Power, RSRP
Reference Signal Received Quality, RSRQ Typically, a Base Station (BS) such as an eNodeB receives from each wireless device (in LTE UE) served by the network node (and compliant with the proposed methods), a measurement report e.g. CQI report, which additionally comprises positioning information. In one example embodiment the positioning information is received separately from the channel quality information. The positioning information comprises information that enables the BS to estimate the UEs position.

According to some aspects the method further comprises estimating S2, for the wireless devices, based on the respective received signal an angle of arrival, AoA, of the wireless device. The AoA is e.g. a mean and a standard deviation for the respective wireless device. The eNodeB then typically keeps track of the positions of the wireless devices and of the Angle of Arrival of the respective signals received from the wireless devices.

The actual pilot coordination is performed in a pilot coordination unit which may be separated from the base station. The AoA information is provided to the pilot coordination unit.

Hence, the method further comprises providing S3, to a pilot coordination unit 120, based on the received information, information defining estimated angles of arrival in the network node 110a, 110b, of wireless devices 10a, 10b served by the network node. According to some aspects the network node also provides the distance between the network node and the respective wireless devices to the pilot coordination unit. Alternatively the positions are provided, wherein the distance may be calculated in the pilot coordination unit.

In one example embodiment, the AoA (mean plus standard deviation) is estimated in the network node 110 and sent to the pilot coordination unit. For example over a backhaul.

Alternatively the pilot coordination unit is implemented in the network node. Then the AoA information is internally provided to the pilot coordination unit or module that is performing the allocation. This corresponds to that the pilot coordination unit obtains S11 the values (e.g. using a memory) as described above. If the pilot coordination unit is implemented in the network node, steps S12, S14, S15 (and possibly S13) would now be performed by the network node. Note that the pilot coordination unit does not need to be a separate unit, but could be integrated in the network node.

If the network node is estimating S2, for the wireless devices, based on the respective received signal, an angle of arrival of the wireless devices. Then according to some aspects the information provided S3 to the pilot coordination unit comprises the estimated angles of arrival. This embodiment corresponds to that the AoA is estimated in the network node and that the calculated AoA is provided to the pilot coordination unit. An alternative would be to provide positions and scattering information to a pilot coordination unit for AoA estimation in the pilot coordination unit.

According to some aspects the method further comprises receiving S4a from a pilot coordination unit 120 a signal comprising information defining pilot sequences allocated to wireless devices served by the network node. According to some aspects the method further comprises sending S5 to wireless devices served by the network node 110a, 110b information defining pilot sequences allocated to wireless devices served by the network node. According to some aspects the method further comprises allocating S4b pilot sequences, to be used by the wireless devices based on the obtained estimated angles of arrival.

Figure 3D:
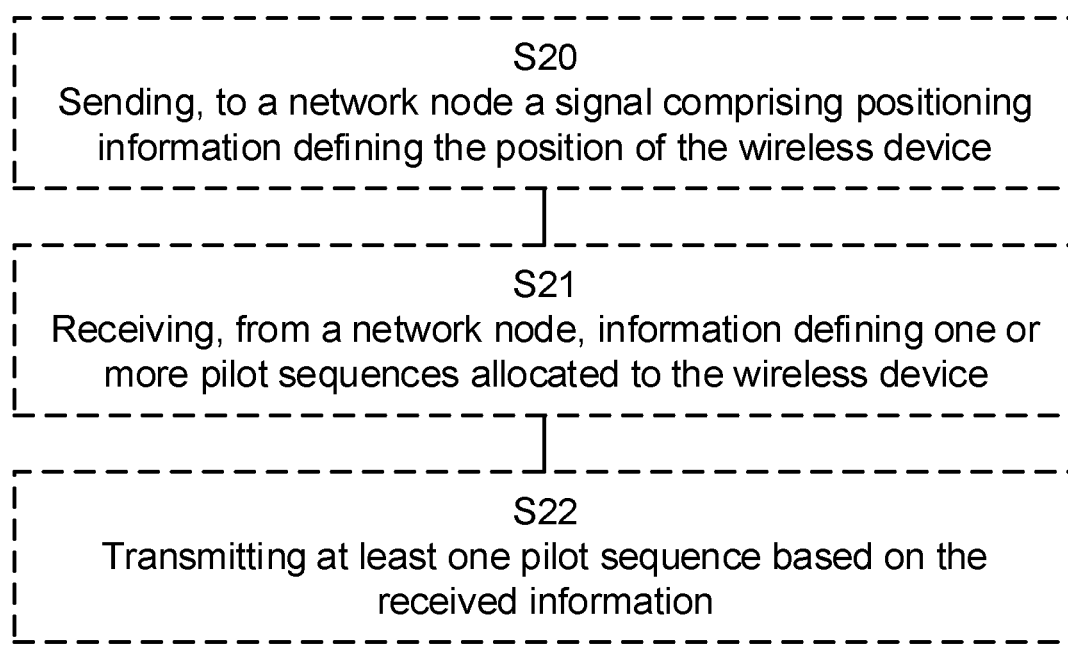
FIG. 3d: discloses a flow chart of example operations in a wireless device

According to some aspects the disclosure relates to a method performed in a wireless device 10a, 10b in a communication system, for enabling coordination of pilot sequences, see FIG. 3d.

According to some aspects, the disclosure relates to a wireless device 10 configured to enable coordination of pilot sequences. Hence, the wireless device 10 needs to provide the necessary information to the pilot coordination unit.

According to some aspects, the disclosure relates to a wireless device configured to send S20, to a network node a signal comprising positioning information defining the position of the wireless device 10.

According to some aspects, the method comprises receiving S21 information defining one or more pilot sequences allocated to the wireless device and transmitting S22 at least one pilot sequence based on the received information.

The wireless device receives a pilot sequence assignment either directly from the pilot coordination unit or from the serving base station. The information may be sent directly in a dedicated transmission. Today there is no such signaling, so it implies a new UE behavior. Subsequently, the UE must be able to use that sequence for constructing its reference signal.

Steps S20 and S21, S22 could be executed independently of each other.

Different aspects and embodiments of the proposed technique will now be described in further detail.

Figure 5:
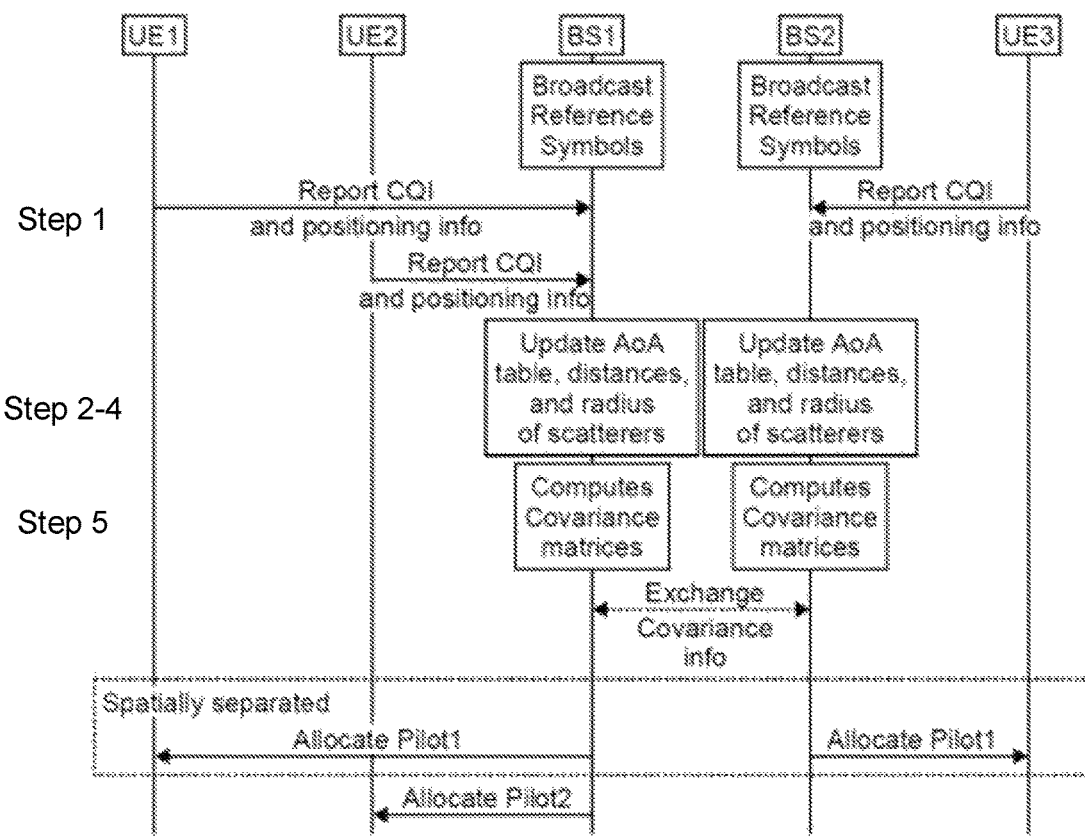
FIG. 5: illustrates Information exchange in a multicell system according to one embodiment of the disclosure.

The proposed technique will now be described in more detail using two example embodiments. These examples are described in terms of execution steps. It should however be clear for the skilled person that the steps below do not necessarily mean a serial execution in time, rather some of them may be executed simultaneously or in an overlapping fashion as indicated in the description. A basic sequence of reporting events is shown in FIG. 5. In this example the pilot coordination unit is included in the network nodes. For simplicity this example only comprises two network nodes (or base stations). However, pilots may of course be coordinated between more than two network nodes using the same principles.

Figure 6:
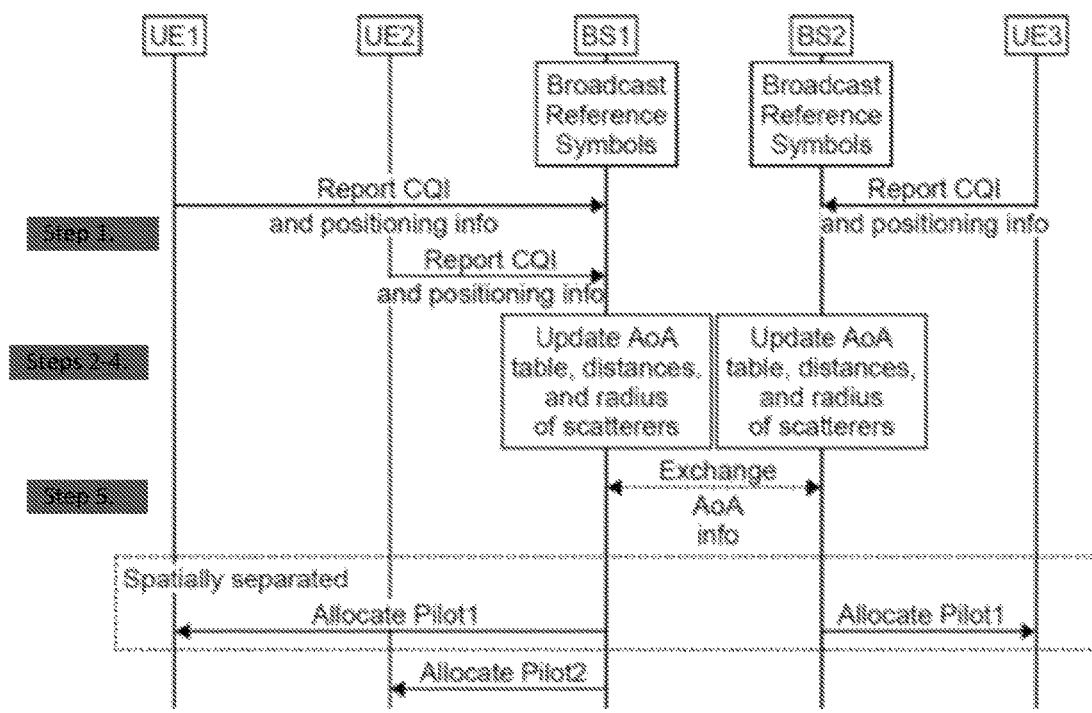
FIG. 6: illustrates information exchange in a multicell system according to another embodiment of the disclosure.

There are two different embodiments are illustrated in FIGS. 5 and 6. However, the first 4 steps are the same in both embodiments.

1. In communication systems, the BSs periodically or continuously broadcasts reference signals that the UEs may use for making measurements in order to be able to estimate the channel quality. The UEs within the serving area of a BS continuously report their channel quality information, CQI. In addition, the UEs report their position info with respect to their respective serving BS either continuously or due to a triggered event (for example, change of position or change in the measured DL reference signal received power, RSRP), or due to a combination of these two conditions (event triggered periodic reporting). The positioning information comprises information that allows the BS to estimate the UEs position. We denote the position of User-i with $x_i^u$, where we note that $x_i^u$ is a 2 or 3 dimensional vector containing the user coordinates in some suitable coordinate system. Examples for this include geographical coordinates using the coordinate system of a cellular network in an O&M system, Global Positioning System, GPS, or other satellite based system coordinates.

2. BS-k maintains a table (called the AoA Table) in which the BS continuously updates the served UE:s coordinates. In addition, the BS continuously maintains the following quantity, as the current estimate of the AoA of User-i at BS-k, associated with UE-i.

a. $\theta_{ik}^{mean} = \arctan((([x_i^u]_2-[x_k^b]_2)/(([x_i^u]_1-[x_k^b]_1)))$, where $[\ ]_1$ and $[\ ]_2$ denotes the components of the location, $x_k^b$ denotes the coordinate vector of BS-k and arc tan denotes the arcus tangent function $\theta_{ik}^{mean}$ denotes the average AoA of User-i and BS-k.

3. BS-k continuously maintains an estimation (based on the position information) of the distance between User-i and the BS ($d_{ik}$) and an estimate of the region covered by the scatters around that user. This region is dependent on the environment of where the UE is operating. For example, this region can be circularly approximated with radius $r_s$. The value of $r_s$ can, for example, be low for rural areas and high for urban areas.

4. BS-k maintains (in the said table of Step 2 above) an entry ($\theta_{ik}^{std}$) associated with each user, which contains the standard deviation of the AoA determined as follows:

$\theta_{ik}^{std} = \arctan(r_s/d_{ik})$,

5. At this point, the BS or NW node proceeds differently depending on two alternative embodiments.

a. According to some aspects (See FIG. 5), the BS estimates the (m,n) entry of the covariance matrix $R_{ik}$ (m,n) of the vector channel between the (single antenna) UE and the BS as follows:

i. $R_{ik}(m,n) = \frac{\beta_{ik}}{2\theta_{ik}^{std}} \int_{-\theta_{ik}^{std}}^{+\theta_{ik}^{std}} \exp(-j2\pi(m-n)D/\lambda \cos(\theta+\theta_{ik}^{mean})d\theta)$, Where D is the antenna spacing at the BS, that is the physical distance between two antenna elements at the BS and λ denotes the wavelength in the particular carrier frequency at which the UE and the BS communicates and β denotes the large scale fading between the BS and the UE. Recall that k is the BS index, i is the user index, j is the imaginary unit.

ii. Covariance matrices of user vector channels can be exchanged between multiple cooperating cells or BSs.

iii. At this stage, prior art techniques in coordinated pilot assignments use the Covariance matrices computed and exchanged above to allocate identical pilot sequences to users that are spatially well separated.

b. According to some aspects (See FIG. 6), the BS does not estimate the covariance matrix $R_{ik}$ (m,n). Instead, the BS uses $\theta_{ik}^{mean}$ and $\theta_{ik}^{std}$.

i. BS-k sends an update of the Table described in Step 2 above to other cooperating BSs. These updates are continuous and/or triggered by continuously moving UEs. Likewise, BS-j (j is not equal to k) sends its updated AoA Table to neighbor BSs, using for example, X2 (inter-BS) signaling).

ii. BS-k uses its own AoA Table (i.e. Table-k) and the set of received Tables from its neighbor BS:s to determine the overlaps between users served by BS-i and BS-j. When BS-k uses Table-j (j is not equal k), BS-j also uses the position of BS-j in the common (absolute) coordinate system to calculate an offset between the AoA at BS-k and BS-j. (FIG. 7)

iii. UEs with the least overlapping AoA support are allocated identical pilots. The AoA support is defined as $[\theta_{ik}^{mean}-\theta_{ik}^{std}, \theta_{ik}^{mean}+\theta_{ik}^{std}]$, and as long as the overlap is less than a certain percentage, the UEs will be allocated identical pilots. (See FIG. 4 for an example.)

Figure 7:
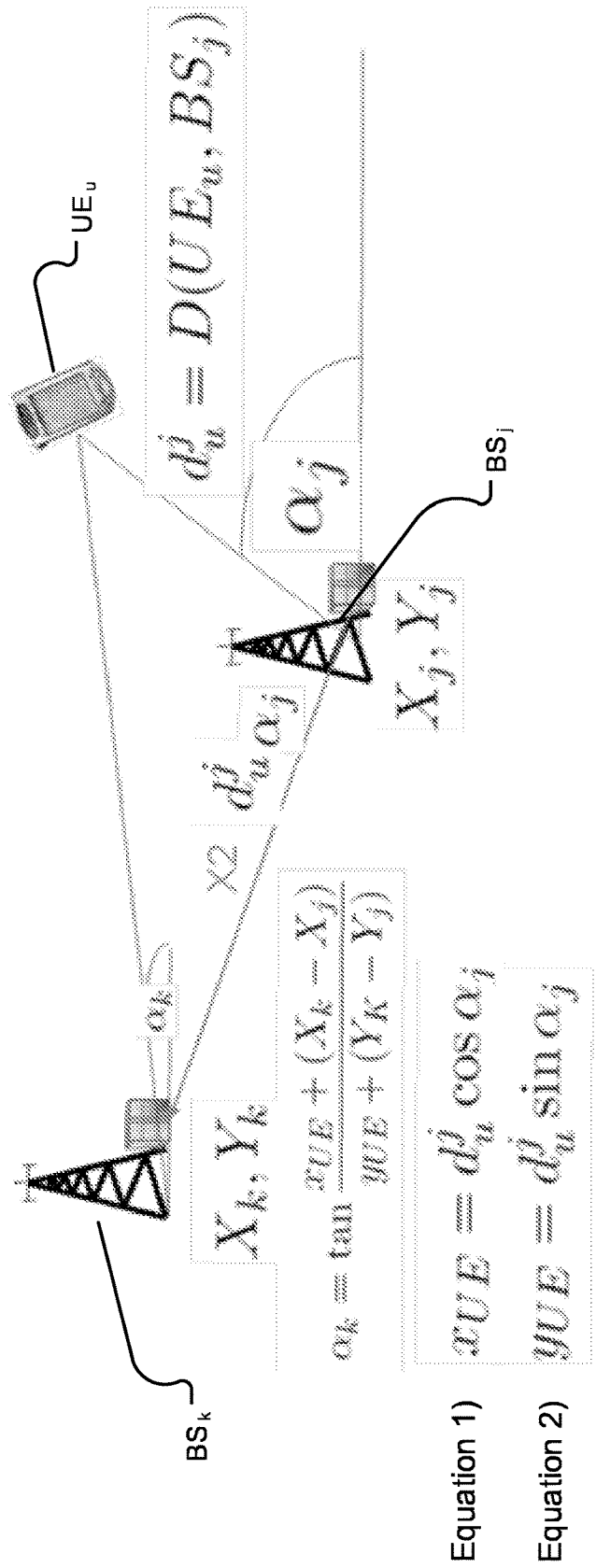
FIG. 7: illustrates information exchange in a multicell system according to a second embodiment.

FIG. 7: BS-j uses X2 signaling to send its updated AoA table to BS-k. The AoA table of BS-j contains parameters d and alpha with respect to a served UE. These two parameters allow the BS-k to convert the estimated AoA valid at BS-j to alpha-k that is valid at BS-k with respect to the said UE served by BS-j.

EXAMPLE NODE EMBODIMENTS

Figure 8:
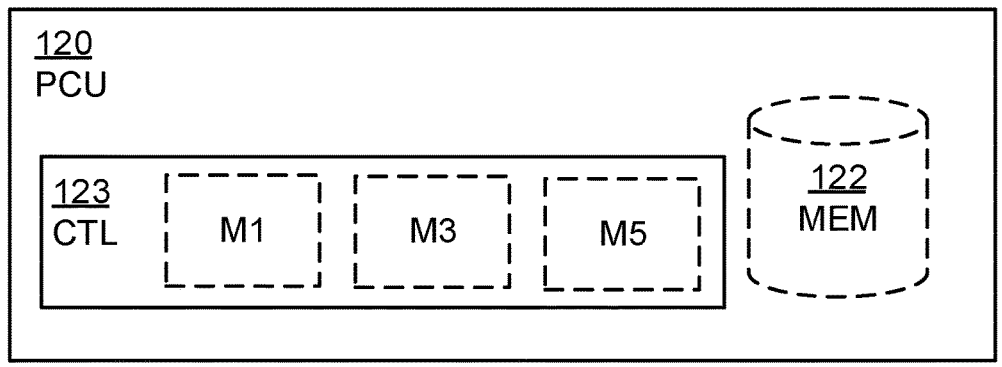
FIG. 8: discloses a block diagram for an example node implementation of a pilot coordination unit

FIG. 8 illustrates an example pilot coordination unit 120 or pilot allocation unit, according to some of the example embodiments, wherein the pilot coordination unit 120 is configured to coordinate pilot sequences used by several wireless devices 10a, 10b served by one or more network nodes 110a, 110b.

The pilot coordination unit 120 comprises processing circuitry 123 configured to cause the pilot coordination unit to obtain, estimated angles of arrival, of the wireless devices 10a, 10b, in the corresponding serving network nodes 110a, 110b, to allocate pilot sequences, to be used by the wireless devices 10a, 10b based on the obtained estimated angles of arrival, and to provide S15 information to the wireless devices about the respective allocated pilot sequence.

The processing circuitry 123 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry 123 need not be provided as a single unit but may be provided as any number of units or circuitry. The processing circuitry 123 may be capable of executing computer program code. The pilot coordination unit 120 may comprise a memory, MEM 122. The memory 122 may be comprised in the processing circuitry 123. A computer program may be stored in the memory 122. The computer program may, when run in the pilot coordination unit 120, cause the pilot coordination unit 120 to perform aspects of the method as disclosed above. The memory 122 can be any combination of a Random Access Memory, RAM, and a Read Only Memory, ROM. The memory 122 may comprise persistent storage, e.g., non-transitory computer readable recording medium, which, for example, can be any single one or combination of magnetic memory, optical memory, or solid state memory or even remotely mounted memory.

According to some aspects, the estimated angles of arrival comprise an expected mean and a standard deviation of the angle of arrival. According to some aspects, the processing circuitry 123 is configured to cause the pilot coordination unit 120 to allocate pilot sequences by calculating an overlap of angle spread angles of arrival and allocating the pilots such that any overlap of angle spread angles of arrival is less than a predefined percentage.

According to some aspects, the processing circuitry 123 is configured to calculate for the wireless devices based on the angles of arrival, a covariance matrix of a vector channel between the wireless device and the respective serving network node and to allocate the pilot sequences based on the calculated covariance matrices.

According to some aspects, the processing circuitry 123 is configured to obtain estimated angles of arrival by obtaining for the wireless devices a respective distance between the wireless device and a corresponding serving network node 110a, 110b, and to allocate the pilot sequences based on the obtained distances.

According to some aspects, the processing circuitry 123 is configured to cause the pilot coordination unit 120 to receive, from the network nodes 110a, 110b a signal comprising information defining a respective estimated angle of arrival in the network node of wireless devices 10a, 10b served by the network node 100.

According to some aspects, the processing circuitry 123 is configured to provide information to the wireless devices, about the respective allocated pilot sequence, by sending to the serving network nodes 100 a signal comprising information defining pilot sequences allocated to wireless devices served by the network node.

The pilot coordination unit 120 is configured to perform all the aspects of the technique described above, relating to a pilot coordination unit.

According to some aspects the processing circuitry 123 comprises modules configured to perform the methods described above. Hence, according to some aspects, the processing circuitry 123 comprises an obtainer module M1 configured to obtain, estimated angles of arrival, of the wireless devices 10a, 10b, in the corresponding serving network nodes 110a, 110b. The processing circuitry 123 further comprises an allocation module M3 configured to allocate pilot sequences, to be used by the wireless devices 10a, 10b based on the obtained estimated angles of arrival. The processing circuitry 123 further comprises a provider module M5 configured to provide S15 information to the wireless devices about the respective allocated pilot sequence. According to some aspects, the pilot coordination unit is implemented in a computer cloud. According to some aspects, the pilot coordination unit is implemented in a software defined network, SDN.

Further details and advantages of the following aspects have been discussed above relating to aspects of the disclosed method.

Figure 9:
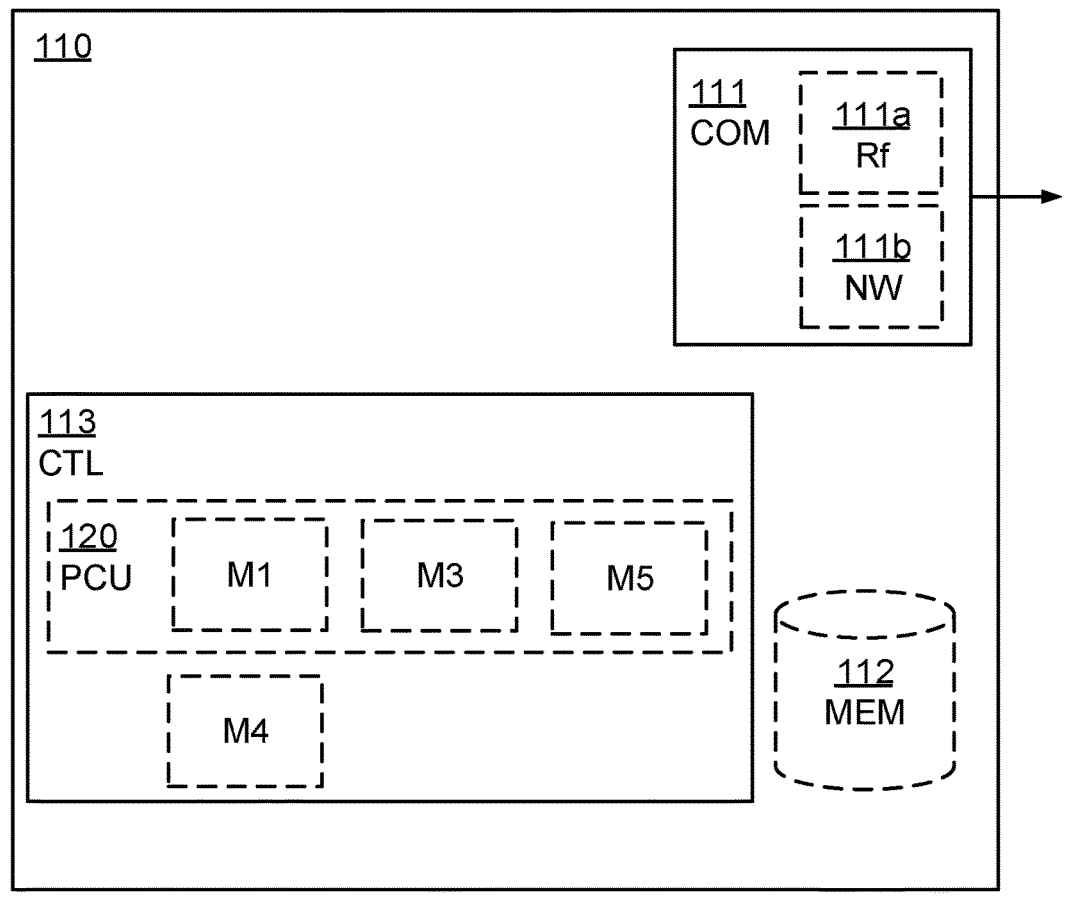
FIG. 9: discloses a block diagram for an example node implementation of a network node

FIG. 9 illustrates an example network node 110, according to some of the example embodiments, wherein the network node 110 is configured for enabling coordination of pilot sequences.

The network node 110a comprises a communication interface 111 configured for communication with wireless devices. According to some embodiments, the communication interface 111 comprises one or more transceiver antennas. According to some further embodiments, the communication interface 111 comprises a radio communication interface 111a and a network communication interface 111b. According to some yet further embodiments, the radio communication interface 111a is configured for communication with wireless devices within reach of the network node over a radio communication technology.

According to some yet further embodiments, the network communication interface 111b is configured for communication with other network nodes. This communication is often wired e.g. using fiber. However, it may as well be wireless. The connection between network nodes is generally referred to as the backhaul.

The network node 110 comprises processing circuitry 113 configured to cause the network node to receive S1, from the wireless devices 10a, 10b served by the network node 110a, 110b, a signal comprising positioning information defining the position of the wireless device 10a, 10b and to provide S3, to a pilot coordination unit 120, information defining estimated angles of arrival in the network node 110a, 110b, of wireless devices 10a, 10b served by the network node. According to some aspects, the signal comprising positioning information is received over a radio communication interface 111a. According to some aspects the signal further comprises information defining the quality of a channel between the network node and the wireless device.

According to some embodiments, a network communication interface 111b is used for communicating with the pilot coordination unit 120.

The processing circuitry 113 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry 113 need not be provided as a single unit but may be provided as any number of units or circuitry. The processing circuitry 113 may be in communication, directly or indirectly, with a radio communication interface (not shown). The processing circuitry 113 may be capable of executing computer program code. The pilot coordination unit 120 may comprise a memory, MEM 112. The memory 112 may be comprised in the processing circuitry 113. A computer program may be stored in the memory 112. The computer program may, when run in the pilot coordination unit 120, cause the pilot coordination unit 120 to perform aspects of the method as disclosed above. The memory 112 can be any combination of a Random Access Memory, RAM, and a Read Only Memory, ROM. The memory 112 may comprise persistent storage, which, for example, can be any single one or combination of magnetic memory, optical memory, or solid state memory or even remotely mounted memory.

According to some aspects, the processing circuitry 113 is configured to estimate, for the wireless devices, based on the respective received signal, an angle of arrival of the wireless device and wherein the information provided to the pilot coordination unit comprises the estimated angles of arrival.

According to some aspects, the processing circuitry 113 is configured to receive, using the communication interface 111, from a pilot coordination unit 120, a signal comprising information defining pilot sequences allocated to wireless devices served by the network node.

According to some aspects, the processing circuitry 113 is configured to allocate pilot sequences, to be used by the wireless devices based on the estimated angles of arrival.

According to some aspects, the processing circuitry 113 is configured to send, using the communication interface 111, to wireless devices served by the network node 110a, 110b information defining pilot sequences allocated to wireless devices served by the network node.

The network node 110 is configured to perform all the aspects of the technique described above, relating to a network node.

The network node 110a comprises in one embodiment a pilot coordination unit as described above in relation to FIG. 7. This embodiment implies that the network node (or the processing circuitry 113) is further configured to obtain and receive, estimated angles of arrival, of wireless devices 10a, 10b, in their corresponding serving network nodes 110a, 110b, and to allocate pilot sequences, to be used by the wireless devices 10a, 10b based on the obtained estimated angles of arrival, and to provide S15 information to the wireless devices about the respective allocated pilot sequence as discussed above.

According to some aspects the processing circuitry 113 comprises modules configured to perform the methods described above. Hence, according to some aspects, the processing circuitry 113 comprises a receiver module M4 configured to receive, from the wireless devices 10a, 10b served by the network node 110a, 110b a signal comprising information defining the quality of a channel between the network node and the wireless device and positioning information defining the position of the wireless device 10a, 10b. The processing circuitry 113 further comprises a provider module, configured to provide, to a pilot coordination unit 120, information defining estimated angles of arrival in the network node 110a, 110b, of wireless devices 10a, 10b served by the network node.

According to some aspects, the processing circuitry 113 also comprises an obtainer module M1 configured to obtain, estimated angles of arrival, of the wireless devices 10a, 10b, in the corresponding serving network nodes 110a, 110b. The processing circuitry 113 further comprises an allocation module M2 configured to allocate pilot sequences, to be used by the wireless devices 10a, 10b based on the obtained estimated angles of arrival. The processing circuitry 123 further comprises a provider module M3 configured to provide S15 information to the wireless devices about the respective allocated pilot sequence.

Further details and advantages of the following aspects have been discussed above relating to aspects of the disclosed method.

Figure 10:
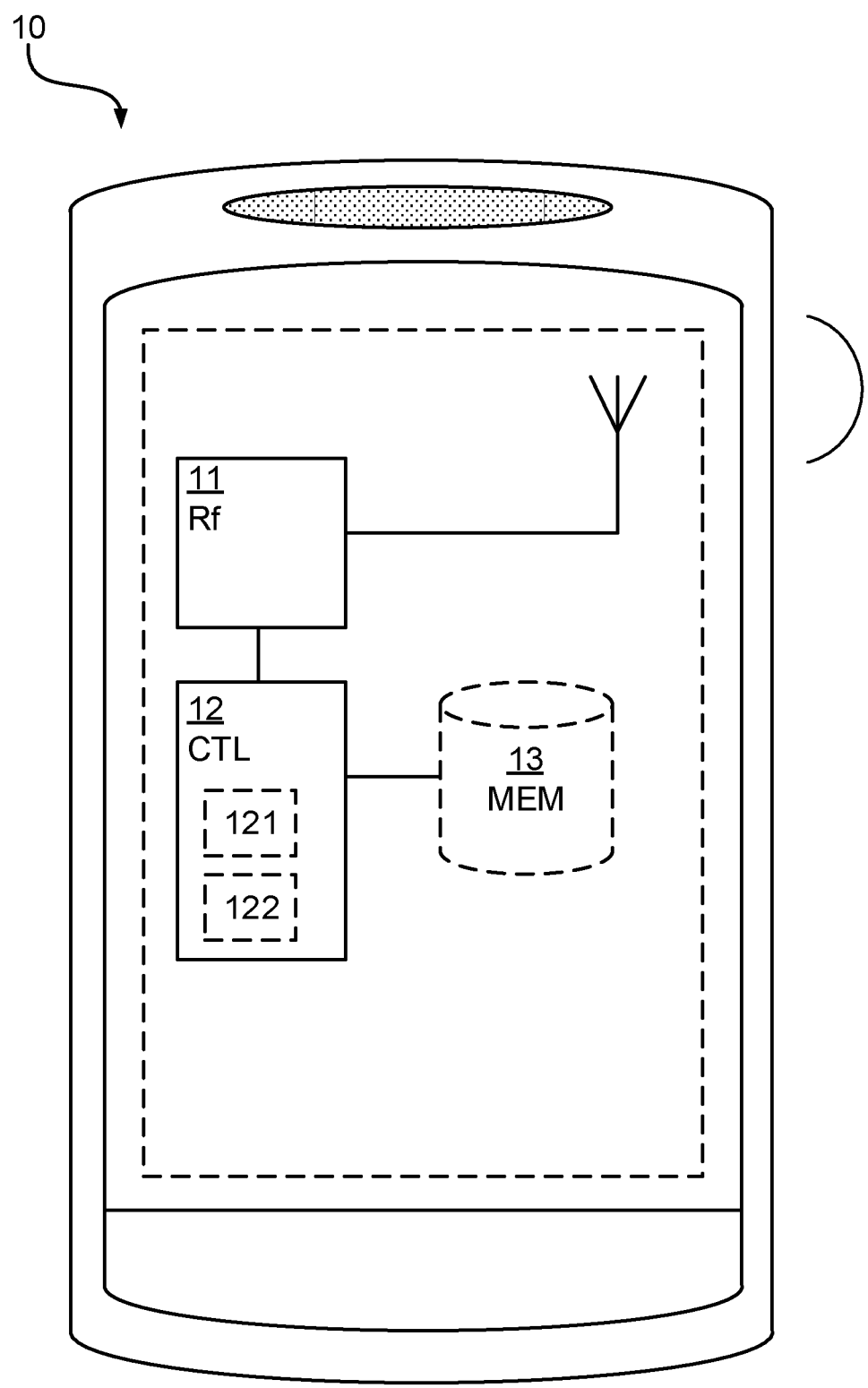
FIG. 10: discloses a block diagram for an example node implementation of a wireless device

FIG. 10 illustrates an example wireless device 10 for enabling coordination of pilot sequences, according to some of the example embodiments, wherein the wireless device 10 is configured to receive information defining one or more pilot sequences allocated to the wireless device 10 and to transmitting at least one pilot sequence based on the received information.

As shown in FIG. 10, the wireless device 10 comprises a radio communication interface 11 configured for communication with a network node. According to some aspects, the radio communication interface 11 is configured to receive and transmit any form of communications or control signals within a network. It should be appreciated that the radio communication interface 11 may be comprised as any number of transceiving, receiving, and/or transmitting units or circuitry. It should further be appreciated that the radio communication interface 11 may be in the form of any input/output communications port known in the art. The radio communication interface 11 may comprise RF circuitry and baseband processing circuitry (not shown).

The wireless device 10 may further comprise at least one memory unit or circuitry 13 that may be in communication with the radio communication interface 11. The memory 13 may be configured to store received or transmitted data and/or executable program instructions. The memory 13 may also be configured to store any form of beam-forming information, reference signals, and/or feedback data or information. The memory 13 may be any suitable type of computer readable memory, e.g., non-transitory computer readable recording medium, and may be of volatile and/or non-volatile type. According to some aspects, the disclosure relates to a computer program comprising computer program code which, when executed in a first wireless device, causes the first wireless device to execute any aspect of the example node operations described above.

The wireless device 10 may further comprise further processing circuitry 12 which may be configured to cause the wireless device 10 to receive, using the radio communication interface (11), information defining one or more pilot sequences allocated to the wireless device. The processing circuitry 12 is also configured to transmit, using the radio communication interface (11), at least one pilot sequence based on the received information.

The processing circuitry 12 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry. According to some aspects, the processing circuitry 12 is configured to send, using the radio communication interface 11, to a network node, a signal comprising positioning information defining the position of the wireless device 10a, 10b.

According to some aspects the processing circuitry 12 comprises modules configured to perform the methods described above. The modules are implemented in hardware or in software or in a combination thereof. The modules are according to one aspect implemented as a computer program stored in a memory 13 which run on the processing circuitry 12.

Hence, according to some aspects, the processing circuitry 12 comprises a receiver module 121 configured to receive information defining one or more pilot sequences allocated to the wireless device 10. The processing circuitry 12 further comprises a transmitter module 122 configured to transmit at least one pilot sequence based on the received information.

The wireless device is configured to perform all the aspects of the technique described above, relating to a wireless device.

Within the context of this disclosure, the terms "wireless terminal" or "wireless device" encompass any device which is able to communicate wirelessly with another device, as well as, optionally, with an access node of a wireless network, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

The invention claimed is:

1. A method, performed in a network node in a communication system, for enabling coordination of pilot sequences, the method comprising:
   receiving, from wireless devices served by the network node and/or by one or more other network nodes, positioning information defining the position of the wireless device;
   for the wireless devices, estimating, based on the respective received positioning information, an angle of arrival of a signal received from the corresponding wireless device by the network node serving the corresponding wireless device;
   allocating pilot sequences to be used by the wireless devices based on the estimated angles of arrival; and
   providing information to the wireless devices about the respective allocated pilot sequences.

2. The method of claim 1, wherein providing the information to the wireless device comprises sending, to the wireless devices served by the network node, information defining the pilot sequences allocated to the wireless devices served by the network node.

3. The method of claim 1 wherein the estimated angles of arrival comprise an expected mean and a standard deviation of the angles of arrival.

4. The method of claim 1 wherein allocating the pilot sequences comprises:
   calculating an overlap of angle spread angles of arrival; and
   allocating the pilot sequences such that any overlap of angle spread angles of arrival is less than a predefined percentage.

5. The method of claim 1 further comprising:
   based on the angles of arrival, calculating, for the wireless devices, a covariance matrix of a vector channel between the wireless device and the network node serving the corresponding wireless device;
   wherein allocating the pilot sequences comprises allocating the pilot sequences based on the calculated covariance matrices.

6. The method of claim 1 further comprising:
   obtaining, for the wireless devices, a respective distance between the wireless device and the network node serving the corresponding wireless device;
   wherein allocating the pilot sequences comprises allocating the pilot sequences based on the obtained distances.

7. The method of claim 1 wherein providing the information to the wireless device comprises sending, to the one or more other network nodes, a signal comprising information defining the pilot sequences allocated to the wireless devices served by the one or more other network nodes.

8. A network node configured for coordinating pilot sequences, the network node comprising:
   a communication interface configured for communication with wireless devices; and
   processing circuitry configured to cause the network node to:
      receive, from wireless devices served by the network node and/or by one or more other network nodes, positioning information defining the position of the wireless device;
      based on the respective received positioning information, estimate for the wireless devices an angle of arrival of a signal received from the corresponding wireless device by the network node serving the corresponding wireless device;
      based on the estimated angles of arrival, allocate pilot sequences to be used by the wireless devices; and
      provide information to the wireless device about the respective allocated pilot sequences.

9. The network node of claim 8 wherein the estimated angles of arrival comprise an expected mean and a standard deviation of the angles of arrival.

10. The network node of claim 8 wherein the processing circuitry causes the network node to allocate the pilot sequences by:
   calculating an overlap of angle spread angles of arrival; and
   allocating the pilot sequences such that any overlap of angle spread angles of arrival is less than a predefined percentage.

11. The network node of claim 8 wherein:
   the processing circuitry further causes the network node to, based on the angles of arrival, calculate for the wireless devices a covariance matrix of a vector channel between the wireless device and the network node serving the corresponding wireless device;
   the processing circuitry causes the network node to allocate the pilot sequences by allocating the pilot sequences based on the calculated covariance matrices.

12. The network node of claim 8 wherein:
   the processing circuitry causes the network node to obtain, for the wireless devices, a respective distance between the wireless device and the network node serving the corresponding wireless device;
   the processing circuitry causes the network node to allocate the pilot sequences by allocating the pilot sequences based on the obtained distances.

13. The network node of claim 8 wherein the processing circuitry causes the network node to provide the information to the wireless device by sending, to the one or more other network nodes, a signal comprising information defining the pilot sequences allocated to the wireless devices served by the one or more other network nodes.

14. The network node of claim 8, wherein the processing circuitry causes the network node to provide the information to the wireless device by sending, to wireless devices served by the network node, information defining the pilot sequences allocated to wireless devices served by the network node.

15. A non-transitory computer readable recording medium storing a computer program product for enabling coordination of pilot sequences, the computer program product comprising software instructions which, when run on processing circuitry of a network node in a communication system, causes the network node to:

receive, from wireless devices served by the network node and/or by one or more other network nodes, positioning information defining the position of the wireless device;

based on the respective received positioning information, estimate for the wireless devices an angle of arrival of a signal received from the corresponding wireless device by the network node serving the corresponding wireless device;

based on the estimated angles of arrival, allocate pilot sequences to be used by the wireless devices; and provide information to the wireless devices about the respective allocated pilot sequences.

16. A method, performed in a wireless device in a communication system, for enabling coordination of pilot sequences, the method comprising:

sending, to a network node, positioning information defining the position of the wireless device;

receiving, from the network node, information defining one or more pilot sequences allocated to the wireless device based on angles of arrival of a signal received from the wireless device by the network node serving the wireless device, the angles of arrival being estimated based on the positioning information sent by the wireless device; and transmitting at least one pilot sequence based on the received information.

17. The method of claim 16, wherein the wireless device sends the positioning information due to a change of position of the wireless device.

18. A wireless device configured to enable coordination of pilot sequences, the wireless device comprising:

a radio communication interface configured for communication with a network node; and processing circuitry configured to cause the wireless device to:

use the radio communication interface to send, to the network node, positioning information defining the position of the wireless device;

use the radio communication interface to receive, from the network node, information defining one or more pilot sequences allocated to the wireless device based on angles of arrival of a signal received from the wireless device by the network node serving the wireless device, the angles of arrival being estimated based on the positioning information sent by the wireless device; and use the radio communication interface to transmit at least one pilot sequence based on the received information.

19. The wireless device of claim 18, wherein the processing circuitry is configured to send the positioning information due to a change of position of the wireless device.

20. A non-transitory computer readable recording medium storing a computer program product for enabling coordination of pilot sequences, the computer program product comprising software instructions which, when run on processing circuitry of a wireless device, causes the wireless device to:

send, to a network node, positioning information defining the position of the wireless device;

receive, from the network node, information defining one or more pilot sequences allocated to the wireless device based on angles of arrival of a signal received from the wireless device by the network node serving the wireless device, the angles of arrival being estimated based on the positioning information; and transmit at least one pilot sequence based on the received information.

* * * * *